United States Patent [19]

Yasukawa et al.

[11] Patent Number: 4,912,803
[45] Date of Patent: * Apr. 3, 1990

[54] WIPER BLADE RUBBER

[75] Inventors: Takemasa Yasukawa; Hiroshi Sugita, both of Ichinomiya; Tetsushi Hiramitsu, Kasugai, all of Japan

[73] Assignee: Toyoda Gosei Co., Ltd., Aichi, Japan

[*] Notice: The portion of the term of this patent subsequent to Apr. 3, 2003 has been disclaimed.

[21] Appl. No.: 480,926

[22] Filed: Mar. 31, 1983

[30] Foreign Application Priority Data

Apr. 3, 1982 [JP] Japan ................................ 57-055589
Apr. 3, 1982 [JP] Japan ............................. 57-48393[U]

[51] Int. Cl.$^4$ ................................................ A47L 1/00
[52] U.S. Cl. ................................. 15/250.36; 428/336; 428/408
[58] Field of Search ......................... 15/250.42, 250.36; 428/327, 492, 493, 336, 328, 323, 408, 407

[56] References Cited

FOREIGN PATENT DOCUMENTS 113545 9/1980 Japan ..................................... 250/36

Primary Examiner—Alexander S. Thomas
Attorney, Agent, or Firm—Cushman, Darby & Cushman

[57] ABSTRACT

A wiper blade rubber provided with a surface layer containing more than 50% by volume of lubricative fine powder at least on the surface of a sliding portion thereof including a lip. The surface layer is integrally press-formed with the substrate of wiper blade rubber in one body so as to be vulcanized. The wiper blade rubber having such a surface layer is produced by a method according to the present invention which is characterized in that a starting article as the substrate of wiper blade rubber and a cavity provided in a separate mold used for this purpose has such a dimensional relationship therebetween that the thickness of the starting article at the center in the transverse section thereof is 0.9 to 1.0 times the thickness of the corresponding central portion of the cavity, where the lip of wiper blade rubber is defined. And the starting article has such a shape in the transverse section thereof that the central thin portion thereof is connected to the respective thick end portions thereof at an angle ranging from 20° to 45°, which is defined by a line elongated along the central thin portion thereof and another line elongated along the connecting portion thereof. The wiper blade rubber according to the present invention has a small sliding resistance as well as excellent durability.

3 Claims, 2 Drawing Sheets

WIPER BLADE RUBBER

BACKGROUND OF THE INVENTION

1. Field of the Invention:

This invention relates to an improved wiper blade rubber having a small sliding resistance and a method producing the same.

2. Description of the Prior Art:

A wiper blade rubber comprises a rod-shaped base portion and a sliding portion provided with a lip in the form of a thin plate. The wiper blade rubber has an elongated form and it is used for a rubbing member of a wiper. Thus, the wiper blade rubber is of a sliding member to wipe up or remove water from the surface of such as a front glass of an automobile.

Conventionally, this blade rubber has been made of rubber to utilize the flexibility thereof. The wiper blade rubber is slid along the surface of a glass thereby to wipe up water therefrom.

In this case, there is such an advantage that the wiper blade rubber has flexibility, because the component of which is rubber. However, there is also such a contrary disadvantage that the wiper blade rubber has a large sliding resistance.

So, in order to produce a rubber sliding member having a small sliding resistance, for example, the following prior method has been proposed.

Namely, a lubricative fine power, such as graphite, molybdenum disulfide, fluroplastic in the form of powder or the like, is added to an elastomer binder containing a vulcanization agent and mixed by a roll mill or a banbury mixer. (Hereinafter, the aforesaid lubricative fine powder may be called "a lubricant".) Then, the resulting mixture is formed into a sheet by using a calendar roll or the like and the sheet is placed on a non-vulcanized product body. And then, the elastomer binder and elastomer product are vulcanized in one body by heating and pressing them thereby to form a sliding layer on the elastomer product body.

In this prior method, however, it is required to use a large amount of elastomer binder relative to that of lubricant to be used (e.g., the amount thereof being more than 2.5 times the amount of lubricant in the normal volume ratio), because a roll mill, banbury mixer, calender roll or the like must be used in the aforesaid steps. Therefore, the amount of lubricant contained in the formed sliding layer becomes relatively small. As a result, the sliding layer thus formed has little effect in reducing a coefficient of friction of the layer. Moreover, the aforesaid apparatuses, such as a roll mill and mixers, are required for mixing the lubricant with the elastomer binder. Thus, in the prior method, it has not been necessarily easy to form the sliding layer.

Furthermore, according to this prior method, it has also been difficult to form such a sliding surface layer having an entirely uniform thickness on such a thin lip of wiper blade rubber as the thickness thereof is about 0.6 to 1.0 mm. Namely, there have been encountered such disadvantages that the formed sliding layer is too thick, or the lip cracks, or otherwise the sliding layer can not be partially formed on the lip.

On the other hand, in order to reduce the sliding resistance of the wiper blade rubber, other prior methods have been also known.

For example, the surface of the wiper blade rubber is chlorinated to harden the surface thereof. More particularily, firstly, a wiper blade rubber is produced and thereafter, it is chlorinated to harden the surface thereof thereby to reduce the sliding resistance thereof.

Or, there is formed on the surface of the wiper blade rubber a coating layer comprising a lubricant such as molybdenum disulfide powder or the like to reduce the sliding resistance thereof by the coated film of lubricant.

However, the former chlorinating method has poor effect on reducing the sliding resistance of the wiper blade rubber. And also, it can be used only in the case of rubber containing diene groups.

Whereas, according to the latter method, the coating layer formed on the wiper blade rubber comes off from the surface thereof and wears in a short use thereof and therefore, the coating layer formed by the latter method has poor durability.

Accordingly, in the aforesaid prior art, a wiper blade rubber having an excellent durability as well as a small sliding resistance has not been proposed.

SUMMARY OF THE INVENTION

So, the inventor has conducted many investigation in order to overcome the aforesaid disadvantages in the prior art. As a result, the present invention has been developed based on the following confirmations.

Namely, the inventor has confirmed that an improved wiper blade rubber which has overcome the aforesaid disadvantages can be obtained by press-forming in a predetermined mold a surface layer containing more than 50% by volume of lubricative fine powder (lubricant) at the sliding surface thereof and integral with the substrate of wiper blade rubber so as to be vulcanized with uniform thickness. More particularily, firstly, a coating film layer including such a lubricant is formed on the surface of a starting article as the substrate of wiper blade rubber and thereafter, the resulting article is vulcanized by press-forming the same in a predetermined mold, whereby the aforesaid surface layer, which is excellent in wear resistance and is also strong in spall of the layer, can be obtained. Further, it is possible to form the uniform surface layer on the surface of the lip of wiper blade rubber if dimension of the starting article relative to that of a cavity provided in the predetermined separate mold to be used for this purpose is defined to in a predetermined range.

The inventor has completed the present invention based on these facts as described above.

Accordingly, one object of the present invention is to provide an improved wiper blade rubber having a small sliding resistance as well as an excellent durability.

Another object of the present invention is to provide an improved wiper blade rubber having a uniform and smooth surface layer integrally press-formed with the substrate thereof in a predetermined mold so as to be vulcanized, the aforesaid layer containing more than 50% by volume of lubricant.

Still another object of the present invention is to provide an improved wiper blade rubber which has a proper flexibility and which is excellent in an ability to wipe up water.

Further object of the present invention is to provide an improved method for producing the above-mentioned wiper blade rubber.

Still further object of the present invention is to provide an improved method for vulcanizing the aforesaid surface layer with more stability and uniformity in integral with the substrate thereof in a predetermined press-forming mold.

The foregoing and other objects are effected by the invention, as is apparent from the following description and claims.

BRIEF DESCRIPTION OF THE DRAWINGS

The above and other features and advantages of the present invention will become more apparent from the following description when considered in connection with the accompanying drawings wherein.

DETAILED DESCRIPTION OF THE INVENTION

Figure 1:
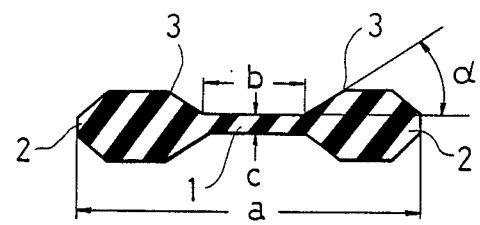
FIG. 1 is a transverse sectional view of a starting article to be formed into a wiper blade rubber, which is employed in EXAMPLES according to the present invention.

One aspect of the present invention provides an improved wiper blade rubber in which a surface layer containing more than 50% by volume of a lubricative fine powder is formed at least on the sliding surface of a sliding portion thereof. And particularly, the surface layer is integrally vulcanized with the substrate of a base portion and the aforesaid sliding portion thereof by press-forming the same in a predetermined mold.

In this case, the base portion in the wiper blade rubber is such a portion as to be attached to an elongated steel plate to provide rigidity in the longitudinal direction thereof on the wiper blade rubber. Whereas, the sliding portion is integrally connected to one side of the base portion and it projects from the aforesaid steel plate. The projecting portion thereof is in contact with the glass surface. A lip in the wiper blade rubber is a portion in the form of thin plate, which is formed at an end portion of the sliding portion.

In a wiper blade rubber according to the present invention, the base portion and the sliding portion thereof are composed of the same rubber material having flexibility as that of the conventional wiper blade rubber. As this rubber material, any elastomer may be used if it can be vulcanized by heat. For example, there can be used a natural rubber or a synthetic rubber such as SBR, CR, NBR, EPDM or the like; or otherwise blends of the aforesaid rubbers to which a mixing material containing a vulcanization agent is added appropriately.

In the wiper blade rubber according to the present invention, since a chlorinating treatment thereto is not required, it is not necessarily required to use a diene type rubber material. And therefore, it is possible to use EPDM having an excellent durability as the rubber material, resulting in production of a wiper blade rubber with more excellent durability.

As a lubricant to be contained in the surface layer formed on the wiper blade rubber, graphite, molybdenum disulfied, fluoroplastic such as polytetrafluorotylene or the like in the form of powder, may be used. The particle diameter of which is 0.01 to 100λ.

As a dispersion medium wherein the lubricant is held, any elastomer may be used if it has a suffciently bonding ability to the substrate of wiper blade rubber. Usually, it is preferable for the substrate in the material thereof.

In addition to elastomer for the dispersion medium, polymer, such as PE,PP or the like, may be added thereto. Furthermore, the dispersion medium may includes therein a mixing material, such as carbon black, zinc oxide or the like.

The thickness of the surface layer is preferably about 5 to 30μ. If the thickness thereof is thinner than 5, the layer has poor durability and it wears in a short use thereof. While, if the thickness is thicker than 30λ, the layer, particularly formed at the lip of wiper blade rubber, has poor flexibility so that it is encountered that cracks occurs in the lip.

The surface layer may be also formed on the surface of the base portion of wiper blade rubber in addition to on the surface of the sliding portion thereof. A tip end portion of the lip in the sliding portion, usually does not constitute the sliding surface and therefore, in this tip end portion, it is not necessarily required to form the surface layer thereon.

However, in this case, the section of the surface layer according to the present invention must be exposed at the conner part of the tip end portion of lip.

In a wiper blade rubber according to the present invention, the surface layer and the substrate thereof are press-formed in one body by a predetermined mold so as to be vulcanized. In other words, the surface layer thus formed is different from that in the case of coating. The surface layer is not formed on the substrate later, but the layer and the substrate are press-formed at the same time. Therefore, an integral bond between the layer and substrate is increased so that there is no fear that the surface layer comes off or spalls off from the sbstrate. Moreover, since the surface of the layer is press-formed in a predetermined mold so as to be vulcanized, the surface layer thus formed can retain the same smooth surface as that of the mold used for this purpose. As a result, the sliding resistance of the layer can be reduced and an ability to wipe up water can be also improved.

Since the surface layer also contains a large amount of lubricant, such as more than 50% by volume, the sliding resistance thereof can be reduced as a whole even if a rubber having a large sliding resistance is employed as a dispersion medium.

The second aspect of the present invention is directed to a method for producing a wiper blade rubber according to the first aspect of the present invention.

According to the second aspect of the invention, in the conventional method for producing a wiper blade rubber which is characterized in that;

(1) an article to be formed having an elongated shape, the central portion of which is thin but both ends of which is thick in the transverse section thereof, is disposed in a separate mold provided with a cavity therein of an elongated shape, which is also thin at the central portion in the transverse section thereof but which is also thick at both ends thereof defining a base portion of wiper blade rubber;

(2) the separate mold disposing the forming article therein is pressed in such a direction as to be closed to obtain a press-formed body thereof; and (3) the press-formed body thus obtained is divided into two parts along the center line thereof thereby to produce two wiper blade rubbers of an elongated shape, each of which is provided with a lip portion at one end thereof and a base portion at the other end thereof; the improvement wherein:

(1) the thickness of the central thin portion of the aforesaid starting article as the substrate of wiper blade rubber in the transverse section thereof is defined to 0.9 to 1.0 times the thickness of the corresponding central thin portion of the aforesaid cavity in the separate mold;

(2) a coating layer is formed on both faces of at least central thin portion of the aforesaid article, the layer containing more than 50% by volume of lubricant under the condition of it being vulcanized and a dispersion medium to be vulcanized; and then (3) the resultant forming article is disposed in the aforesaid cavity of the separate mold to be press-formed therein.

As one of the features of the method according to the present invention, the thickness of the central thin portion of the starting article in the section thereof is defined to from 0.9 to 1.0 times the thickness of the corresponding central thin portion of the cavity in the separate mold.

Conventionally, in vulcanization based on press-forming in a mold, it has been required to use a starting article having a large volume than that of the cavity to obtain a rubber formed-product with high accuracy in dimension thereof.

In contrast with the aforesaid prior art, according to the present invention, the thickness of the central thin portion of the starting article in the section thereof, which constructs a lip of wiper blade rubber, is the same as that of the corresponding thin portion of the cavity or thinner than the thickness thereof so as to be about nine-tenth thereof.

Therefore, the substrate and the coating layer formed thereon comparatively stable so that in the obtained wiper blade rubber, a uniform surface layer is vulcanized in integral with the substrate thereof at the lip portion thereof.

On the other hand, if the thickness of the central thin portion of the starting article in the section thereof is thicker than that of the corresponding thin portion of the cavity or, contrary, thinner than the thickness of nine-tenth thereof, the rubber material of the forming article positioned to the central thin portion of the cavity remarkably flows or moves therein when it is press-formed. As a result, the surface layer formed on the lip of the obtained wiper blade rubber will become rough and non-uniform.

In the meantime, the starting article has such a shape in the transverse section thereof that the aforesaid thin central portion of the article is connected to the respective both thick end portions thereof at an angle ranging from 20° to 45° to a line elongated along the central thin portion.

As a result, the surface layer formed on the lip of the obtained wiper blade rubber can provide more stable uniformity.

If there is formed any groove in the both thick end portions of the article, which groove extends to a longitudinal direction thereof, a large amount of flow or movement of the article is caused therein when it is press-formed. However, if the aforesaid central portion of the article is connected to the respective both end portions thereof at the aforesaid angle range, such flow or movement of the article at the respective both end portions thereof does not so much influence the central portion thereof.

In the meantime, a total volume of the forming article is defined to a degree of slightly more than than of the cavity. A coating layer formed on both faces of at least central thin portion of the article, comprises more than 50% by volume of a lubricant under the condition of it being vulcanized and a dispersion medium retaining this lubricant therein. If the lubricant is less than 50% by volume, the obtained wiper blade rubber has a large sliding resistance.

This coating layer can be formed as follows. Namely a lubricant and an elastomer dispersion medium are mixed with a solvent to be disposed therein thereby to prepare a dispersion liquid, and if necessary, the dispersion medium may contain a vulcanization agent. And then the resulting dispersion liquid thus prepared is coated on the surface of the starting article to scatter such a solvent thereto.

As a dispersion medium, any elastomer can be employed if it is able to be bonded to the starting article as the substrate of wiper blade rubber. Usually, it is preferable for the elastomer to have the same quality as that of the substrate in the material thereof.

In addition, polymer such as PE,PP or the like may be added to the aforesaid elastomer. Whereas, in the same manner as in the starting article, a mixing material such as carbon black, zinc oxide or the like may be also added to the dispersion medium.

These descriptions as to the lubricant, dispersion medium, polymer and mixing material are the same as already explained in the foregoing first aspect of the present invention.

As a vulcanization agent, sulphur or organic peroxide, which is capable of cross linking the dispersion medium, may be added properly. In this case, the amount of the agent to be added is, preferably, slightly more than the amount of the vulcanization agent to be usually added to the elastomer in order to elevate a bonding force of the dispersion medium. However, if the amount of the agent is too much, flexibility of the dispersion medium is redubed to invite unfavorable result. On the other hand, when the formed surface layer is extremely thin, the agent contained in the forming article can be exchanged for the dispersion medium and therefore, it may not be necessarily required to add the agent to the dispersion medium.

As a solvent, a volatile solvent, which is capable of dissolving the dispersion medium therein, such as toluene, xylene, trichloroethylene, torichloroethane or the like is preferable. In this case, however, it is not necessarily required to use the aforesaid solvent, but any other solvent may be also used, if it is capable of dispersing the dispersion medium therein.

The dispersion liquid should be controlled to an appropriate viscosity suitable for coating the same in accordance with the amount of the solvent. Such a coating thereof will be described hereinafter.

The dispersion liquid may be coated on both faces of the central portion in the starting article or in addition thereto, also on both faces of each of the connecting portions in the article, which are respectively connected to the aforesaid central portion, or otherwise on the entire surface of the starting article, by a dipping method, a coating method with a brush, a spraying method or the like.

The thickness of the coating layer is defined to be from 5 to 30μ in the thickness of the surface layer after press-formed.

In the meantime, as already described in the first aspect of this invention, as a material for the starting article, any elastomer may be used.

The forming article, on which the aforesaid coating layer is formed, is disposed in a predetermined cavity of a separate mold, and then the article is press-formed in the separate mold so as to be vulcanized thereby to produce a wiper blade rubber. The aforesaid disposing and press-forming steps for vulcanization molding of the surface layer are the same as the conventional method for producing a wiper blade rubber.

Having generally described this invention, a further understanding can be obtained by reference to certain specific examples which are provided herein for purpose of illustration only and are not intended to be limiting unless otherwise specified.

EXAMPLES

An elastomer mixture, which is composed of 100 parts by weight of EPDM (hereinafter, part standing for "part by weight"), 5 parts of zinc oxide, 1 part of stearic acid, 40 parts of FEF carbon, 0.3 parts of powderedsulphur and 6 parts of peroxide, was sufficiently mixed by a banbury mixer and then from the resulting mixture, a starting article for wiper blade rubber having an elongated shape provided with such a section as shown in FIG. 1, was prepared by means of extrusion molding.

The starting article thus prepared comprises a thin parallel portion 1 at the center thereof, the respective thick end portions 2 and the repective connecting portions 3 through which the thin central portion 1 and the respective thick end portions 2 are connected to each other.

The length (a) of the starting article in the transverse section thereof was about 24 mm, the length (b) of the thin parallel portion 1 of the starting article as the substrate in the transverse section thereof was 4 mm and the angle (α), defined by a line elongated along the central thin portion 1 and another line elongated along the connecting portion 3, was 25°. The thickness (c) of the thin parallel portion 1 was 0.65 mm. The thickness (c) thereof was corresponds to 0.93 times the thickness (d) of the corresponding central portion of the cavity 7 defined by the upper and lower dies 5, 6 of the separate mold which will be explained later in more detail.

Next, as a dispersion medium of a surface layer forming material, EPDM containing 0.3 parts of powdered sulphur and 6 parts of peroxide relative to 100 parts of EPDM admixed thereto, was employed.

Lubricants respectively having volume ratios (lubricant/dispersion medium) as shown in TABLE were also employed for this purpose. In addition, as a solvent, trichloroethylene was employed. These were sufficiently mixed to prepare six kinds of dispersion liquid as represented by Sample Nos. 1 to 6 of TABLE. These six kinds of dispersion liquid were respectively coated on the surfaces of the aforesaid starting articles by a dipping method and thereafter, each of the resultant articles was sufficiently dried thereby to obtain an article to be subjected to the following vulcatization molding (forming article).

Figure 2:
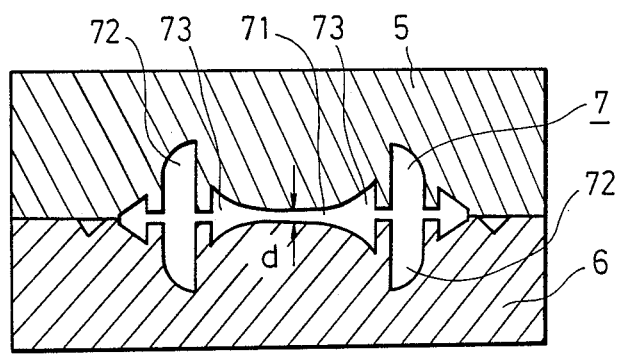
FIG. 2 is a transverse sectional view of a separate mold to be used for forming wiper blade rubbers in EXAMPLES according to the present invention.

As a mold used in this EXAMPLE, a separate mold comprising an upper die 5 and lower die 6 was employed. FIG. 2 shows the section of this separate mold. This separate mold is provided with a cavity 7 therein to produce two wiper blade rubbers at the same time, which are integrally connected with each other at the respective tip ends of the lips thereof. Namely, the forming article is press-formed in the aforesaid cavity 7 so as to vulcanized thereby to produce these two wiper blade rubbers.

The cavity 7 comprises a thin portion 71 at the center thereof, base portions 72 at both ends thereof and connecting portions 73 interconnecting therebetween, each portion 73 having an approximately triangular form in the transverse section thereof. The thin portion 71 thereof defines the respective lips of the two wiper blade rubbers. The thickness (d) of the central thin portion 71 of the cavity 7 was 0.7 mm.

Figure 3:
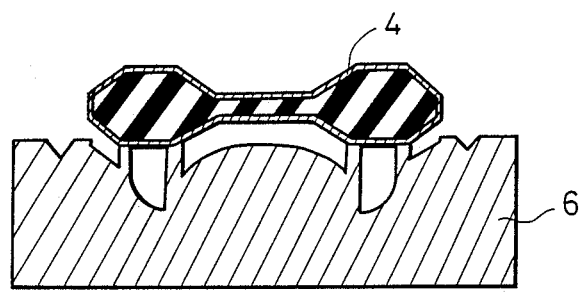
FIG. 3 is a transverse sectional view of a forming article to be subjected to vulcanization molding, wherein a coating layer is formed on the starting article illustrated in FIG. 1 and the forming article is disposed on a lower part of the separate mold illustrated in FIG. 2.
Figure 4:
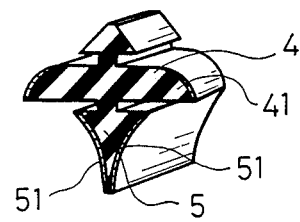
FIG. 4 is a partial perspective sectional view of a wiper blade rubber according to EXAMPLES of the present invention.

Next, the aforesaid separate mold was heated to 175° C. The forming article was disposed on the lower die 6 thereof as shown in FIG. 3 and then the upper die 5 thereof was also disposed on the forming article. The upper die 5 thus disposed was pressed by means of oil pressure to vulcanize the forming article, whereby a formed product for the aforesaid two wiper blade rubbers was obtained. In each of the wiper blade rubbers thus obtained, surface layers 41 and 51 were respectively formed on both side faces of a base portion 40 and a sliding portion 50 connected to the base portion, as partially shown in FIG. 4. The thickness of each surface layers 41, 51 was 10μ.

Figure 5:
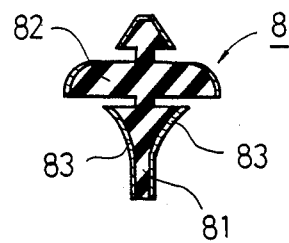
FIG. 5 is a transverse sectional view of a wiper blade rubber produced by a method of EXAMPLES according to the present invention.

The formed product thus obtained was cut at the center thereof to produce two wiper blade rubbers. The section of the wiper blade rubber 8 thus produced was shown in FIG. 5.

In the same method as described above, six kinds of wiper blade rubber 8 were produced by employing six kinds of dispersion liquid (Sample Nos. 1 to 6 ) as shown in TABLE described in EXAMPLE 1.

The wiper blade rubber 8 is provided with a lip 81 at one end thereof, a base portion 82 at the other end thereof and a connecting portion 83 therebetween. The connecting portion 83 has an approximately triangular shape in the section thereof. In this case, the lip 81 and connecting portion 83 thereof are in contact with the glass surface and therefore, they construct a sliding member of the wiper blade rubber.

The lip 81 and connecting portion 83 were respectively provided with surface layers 84 having a uniform thickness of from 10 to 15μ on the opposite side faces thereof.

TABLE

| Sample No. | Lubricant | Lubricant/ Dispersion Medium (volume ratio) | Coefficient of Friction in initial stage (μ) |
|---|---|---|---|
| 1 | Graphite | 0.97 | 2.1 |
| 2 | ↑ | 1.90 | 1.0 |
| 3 | ↑ | 2.95 | 0.8 |
| 4 | ↑ | 3.85 | 0.7 |
| 5 | Molybdenum | 3.62 | 0.7 |

TABLE-continued

| Sample No. | Lubricant | Lubricant/ Dispersion Medium (volume ratio) | Coefficient of Friction in initial stage ($\mu$) |
|---|---|---|---|
| 6 | Disulfide Polytetrafluoro-ethylen(PTFE) | 2.44 | 1.0 |
| Comparison | None | 0 | 4.2 |

Figure 6:
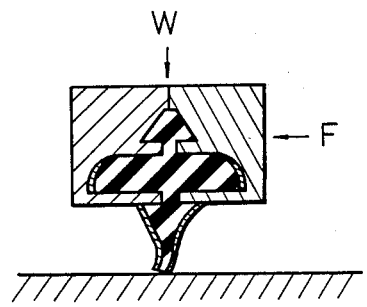
FIG. 6 is a model view showing a method for measuring a coefficient of friction of wiper blade rubbers obtained in EXAMPLES according to the present invention.

To measure sliding resistances of these wiper blade rubbers, each of the wiper blade rubbers was fixed to an appropriate testing means as shown in FIG. 6 and then a force of W=20gf/cm×10cm was applied thereto. Under the aforesaid condition, the wiper blade rubber was reciprocated on the glass surface where muddy water intermittently flowed, at a distance of 50 cm and with a velocity of 35 times/min. Whereby, (coefficient of friction)=F (tensile load)/W(load) in the initial stage (several times) was measured. The result of measurement was shown in TABLE described above.

On the other hand, for comparison, a comparative wiper blade rubber, which had no surface layer thereon but which was only composed of a substrate thereof, was prepared. In the same manner as in EXAMPLES, an initial coefficient of friction thereof was also measured. The result was also shown in the above TABLE.

It is evident from the above TABLE that each wiper blade rubber according to the present invention has such a low coefficient of friction in the initial stage as to be less than 2.1 so that the sliding resistance thereof is also small. Particularly, in the case of more than 2.0 of lubricant/dispersion medium, it is also evident that the initial coefficient of friction of the wiper blade rubber is such small as to be less than 1.0.

Furthermore, in order to test durability of each wiper blade rubber according to these EXAMPLES, the aforesaid sliding test to the wiper blade rubber was repeated. An increased degree of the coefficient of friction in each wiper blade rubber, after reciprocated by a predetermined number of times, was also measured. In this case, an initial value thereof was determined to 1.

Figure 7:
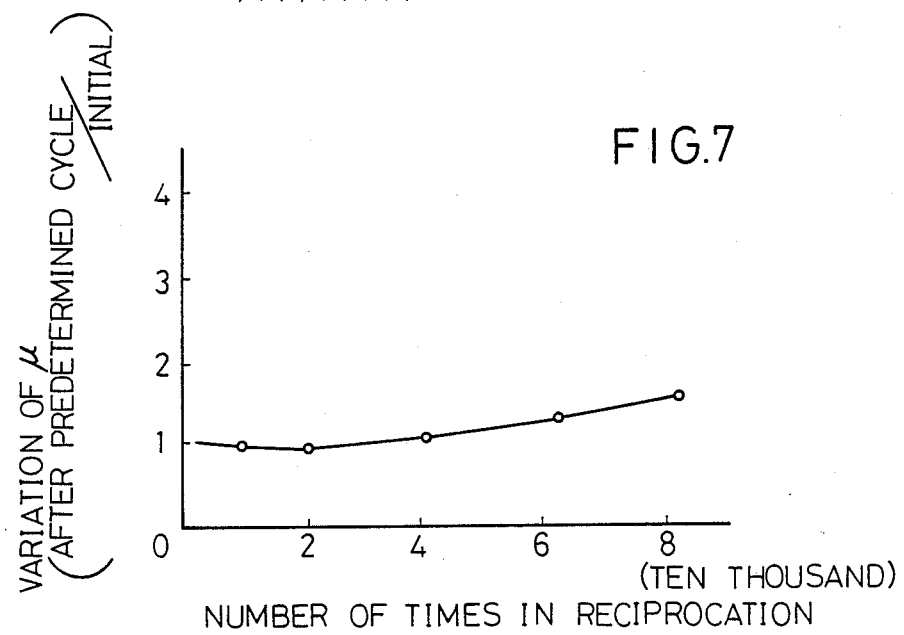
FIG. 7 is a graph showing durability of the wiper blade rubbers in EXAMPLES according to the present invention.

As shown in a continuous line of FIG. 7, the wiper blade rubber according to Sample No. 4 in these EXAMPLES provided a constantly low coefficient of friction and it also maintained a small sliding resistance in long use thereof.

What is claimed is new and intended to be covered by Letters Patent is:

1. In a rubber wiper blade having an elongated shape comprising a rod-shaped base portion and a sliding portion integrally formed with said base portion in one body, said sliding portion including a thin plate-shaped lip, the improvement wherein:
   at least said sliding portion having a smooth, substantially uniform surface layer composed of rubber and containing more than 50% by volume of a fine powder lubricant except for the tip end of said lip; and
   said rubber surface layer is integrally bonded to and vulcanized with said sliding portion.

2. A wiper blade rubber according to claim 1, wherein:
   said fine powder lubricant is one selected from the group consisting of graphite, molybdenum disulfide and fluoroplastic.

3. A wiper blade rubber according to claim 1, wherein:
   said surface layer has a thickness of from 5 to 30 microns.

* * * * *